(12) United States Patent
Bullejos Hita

(10) Patent No.: US 12,528,724 B2
(45) Date of Patent: Jan. 20, 2026

(54) DEVICE FOR PREVENTING THE FORMATION OF LIME SCALES

(71) Applicant: Aquasain Water Tech, S.L., Granada (ES)

(72) Inventor: Raul Bullejos Hita, Granada (ES)

(73) Assignee: Aquasain Water Tech, S.L., Almunecar (ES)

( * ) Notice: Subject to any disclaimer, the term of this patent is extended or adjusted under 35 U.S.C. 154(b) by 231 days.

(21) Appl. No.: 18/310,773

(22) Filed: May 2, 2023

(65) Prior Publication Data
US 2023/0416121 A1    Dec. 28, 2023

(30) Foreign Application Priority Data

Jun. 22, 2022    (ES) .............................. ES202230552

(51) Int. Cl.
*C02F 1/46* (2023.01)
*C02F 1/461* (2023.01)
(Continued)

(52) U.S. Cl.
CPC ........ *C02F 1/4602* (2013.01); *C02F 1/46109* (2013.01); *C02F 1/46176* (2013.01);
(Continued)

(58) Field of Classification Search
CPC ............... C02F 1/4602; C02F 1/46109; C02F 1/46176; C02F 2001/46133;
(Continued)

(56) References Cited

U.S. PATENT DOCUMENTS

| 2,425,424 A | 8/1947 | Jones |
| 2,490,730 A * | 12/1949 | Dubilier ................ C02F 1/4602 |
| | | 204/671 |

(Continued)

FOREIGN PATENT DOCUMENTS

| CN | 108504900 A * | 9/2018 | ............. C22C 18/04 |
| CN | 112197100 A | 1/2021 | |

(Continued)

OTHER PUBLICATIONS

English translation of CN-108504900-A, published Sep. 7, 2018 (Year: 2018).*
Annex to the Communication in EP Application No. 23178040.4 dated Apr. 2, 2024, 3 pages.
Communication from the Examination Division in EP Application No. 23178040.4 dated Apr. 2, 2024, 2 pages.
(Continued)

*Primary Examiner* — Joseph W Drodge
(74) *Attorney, Agent, or Firm* — MARSHALL, GERSTEIN & BORUN LLP

(57) ABSTRACT

The present invention relates to a device for preventing the formation of lime scales in a water pipeline (11) comprising a main body (4) with an inlet (2) and an outlet (3), and an anti-scaling medium (5) configured to prevent the formation of lime scales, located within main body (4), between the inlet (2) and the outlet (3), comprising a galvanic cell, with at least one cathode element (7) and an anode sacrificial element (6), and a support medium (8) of the galvanic cell configured to be fixed to the main body (4); characterized in that the anode sacrificial element (6) is made of an alloy comprising zinc between 89.5-99.5% and aluminum between 0.5 and 10%.

10 Claims, 5 Drawing Sheets

(51) Int. Cl.
*C02F 5/08* (2023.01)
*F16L 58/18* (2006.01)

(52) U.S. Cl.
CPC ............... *C02F 5/08* (2013.01); *F16L 58/18* (2013.01); *C02F 2001/46133* (2013.01); *C02F 2001/46171* (2013.01); *C02F 2303/22* (2013.01); *C02F 2307/14* (2013.01)

(58) Field of Classification Search
CPC ........ C02F 2001/46171; C02F 2303/22; C02F 2307/14; C02F 2001/46152; C02F 2201/002; C02F 1/46; C02F 5/02; C02F 5/08; C02F 5/083; F16L 55/00; F16L 58/00; F16L 58/08; F16L 58/18; C25F 7/00

See application file for complete search history.

(56) References Cited

U.S. PATENT DOCUMENTS

| | | | | |
|---|---|---|---|---|
| 2013/0143071 | A1* | 6/2013 | Kleinle | C23C 18/38 29/458 |
| 2020/0016679 | A1* | 1/2020 | Wang | C23C 2/26 |
| 2021/0188666 | A1* | 6/2021 | Borras | C25B 1/00 |

FOREIGN PATENT DOCUMENTS

| | | |
|---|---|---|
| EP | 4296241 B1 | 1/2025 |
| GB | 2279663 A | 1/1995 |
| GB | 2531535 A | 4/2016 |
| GB | 2531635 A | 4/2016 |
| WO | WO-2019/043004 A1 | 3/2019 |

OTHER PUBLICATIONS

Communication Regarding Intention to Grant a European Patent in EP Application No. 23178040.4, dated Oct. 21, 2024, 5 pages.
Intention to Grant a European Patent in EP Application No. 23178040 dated Oct. 21, 2024, 1 page.
Bibliographical Data of European Patent Application No. 23178040.4 dated Oct. 21, 2024 (annex to Communication Pursuant to Rule 71(3) EPC, 1 page.
European Patent Application No. 23178040.4 dated Oct. 21, 2024 (annex to Communication Pursuant to Rule 71(3) EPC, 1 page.
Text Intended for Grant (clean copy) in European Patent Application No. 23178040.4 dated Jun. 7, 2023, 21 pages.
Text Intended for Grant (version for approval) in European Patent Application No. 23178040.4 dated Jun. 7, 2023, 21 pages.
OEE Work Product, Decision to Grant a European Patent for EP Application No. 23178040.4 dated Jan. 7, 2025, 52 pages.

* cited by examiner

DEVICE FOR PREVENTING THE FORMATION OF LIME SCALES

CROSS-REFERENCE TO RELATED APPLICATION

This application claims priority of Spanish Patent Application No. P202230552, filed Jun. 22, 2022, the contents of which is incorporated herein by reference.

FIELD OF THE INVENTION

The present invention falls within the field of water treatment to prevent the formation of lime scales, specifically in pipelines and devices that use water with a hardness of such magnitude that they can create plugs and situations of out of service of said elements. The field of application is preferably the residential sector without preventing it from being used in other areas where its functionality is demonstrated.

STATE OF THE ART

Calcium carbonate scale, commonly known as lime, is naturally generated on any surface exposed to hard water such as that of rocks, metals or vegetables. These scales are also formed in artificial water pipelines, such as open channels, closed pipes and, of course, in appliances or in any kind of devices that heat the water.

Calcium carbonate may have different crystalline structures. Among them is calcite, a cubic-shaped crystal with the ability to adhere to another material (for example, that of water pipeline) or to itself. Another is aragonite that has a non-scaling and brittle elongated structure and that does not accumulate inside a water pipeline if there is a current of water that drags it and keeps it in suspension. In addition, this crystal has the property of removing old calcite scale which, depending on its thickness and age, can become a complete cleaning.

The process of creating calcium carbonate crystals can be divided into three steps:
  Induction period: time from the creation of the first calcium carbonate molecule to the formation of the first nuclei.
  Nucleation: during which the growth of very small nuclei takes place.
  Crystal growth: in which the formation of the crystalline structure occurs with greater dimensions.

The formation of these calcium carbonate crystals is influenced by multiple factors which, in order of major to minor importance, are:

1) Calcium content:

It is the most important parameter of all. The higher the calcium content, the greater the amount of lime. However, the final amount of calcium carbonate that precipitates is determined by the amount of bicarbonates, the molecule with which calcium previously binds to form carbonates.

So, the greater the temporary hardness, the greater the level of saturation and the greater the amount of lime.

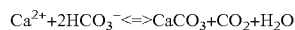

$$Ca^{2+}+2HCO_3^- <=> CaCO_3+CO_2+H_2O$$

2) pH:

The effect of pH has a very strong influence and is more significant than temperature. An increase in pH from 7 to 8 has been experimentally shown to generate scaling five times more than a temperature change of 70° C. in samples of equal hardness.

3) Temperature

For its part, at higher temperature more $CO_2$ is evolved and therefore more scaling is created due to the imbalance in the previous reaction. In addition, at higher temperature the induction period is shortened. Temperature is also important for other reasons. One of them is that normally the first phase of crystallization begins by the formation of aragonite, especially at high temperatures, but then recrystallizes and forms calcite since below 50° C.-60° C. calcite is the most thermodynamically stable crystal. Above that limit aragonite is the crystal that is formed, and in that margin, the two crystals may be present. In this way, it has been proven in boilers that, in short duration and high temperature tests, aragonite deposits have been found on the electrical resistances.

4) Water flow rate:

The scales are reduced as the flow rate of the water is reduced. It can also be said that, at greater speed of passage of the water, greater contribution of calcium.

5) Water quality

The presence of impurities can significantly influence the process of forming crystals. The ions $Fe^{2+}$, $Mg^{2+}$, $Ni^{2+}$, $Zn^{2+}$, $Cu^{2+}$ favor the formation of aragonite, while the ions $Mn^{2+}$, $Cd^{2+}$, $Sr^{2+}$, $Pb^{2+}$ and $Ba^{2+}$ that of calcite.

6) Conduit Material

The adhesion of scales to any surface depends on the nature of the material. So, we can mention from highest to lowest adhesion: copper, aluminum, galvanized steel, brass, stainless steel.

Therefore, the modification of the process of creating the lime crystals can be performed externally. Thus, it is widely known that zinc is one of the ions that best behaves to prevent the formation of lime scales. Said metal can be found on the market in different formats and alloys ranging from pure ingots to alloys well known and appreciated in the industry such as the Zamak family (2, 3, 5) or the Galfan family (5, 10, 15).

The presence of zinc ions affects the process of creation of calcium carbonate crystals, in its different steps:

A) Induction period

Zinc delays the induction period, the more the amount of zinc exists in relation to the amount of calcium present in the water. Such an effect begins to be noticed above a weight ratio of $0.06 \times 10^{-3}$ Zn/Ca.

Also, the precipitation of calcium carbonate begins at a higher pH in the presence of zinc.

Likewise, inhibition of crystal growth occurs partially or completely depending on the Zn/Ca ratio.

B) Nucleation:

Because zinc preferentially precipitates as zinc carbonate and that crystal is very similar to calcite, it blocks growth and causes calcium carbonate to precipitate in the form of aragonite.

The above-described ratio ($0.06 \times 10^{-3}$ Zn/Ca) has proved insufficient to achieve acceptable aragonite formation in an ordinary plumbing installation and it is an object of this invention to increase the amounts of zinc to be dissolved in water. Nor is a large amount of zinc necessary to obtain a complete formation of all the crystals in aragonite so that the plumbing installation is free of lime problems. This is so because aragonite crystals have the ability to drag and clean both old and new calcite scales.

C) Crystal Growth:

Zinc causes a slower growth of crystals. It should not be forgotten that, in the final result of both crystal conversion and inhibition, the chemical parameters discussed above influence the final result.

There is a wide variety of anti-scaling devices on the market that protect water installations against calcareous scale thanks to the dissolution of zinc by electrolytic means within a galvanic cell composed of an anode made of zinc, either pure or an alloy thereof, and a copper or brass cathode.

The main advantage of this water treatment technique is the absence of maintenance throughout the life of the device, all coupled with a simple installation of a device that takes up little space. Obviously, at the time of exhaustion of the zinc anode, it is necessary to replace a new unit.

The main disadvantages of the operation of these devices can be summarized in the following:

As water passes through the galvanic cell, zinc reacts with some compounds (especially sulfates) and deposits are created on its surface that hinder the release of zinc.

Due to this, the amounts of dissolved zinc may not reach the minimum concentrations for good functioning throughout the operating life period. Therefore, it may happen that in the first months the results are correct but at some point, they do not appear because the concentrations of zinc are not sufficient.

Two things can be done to maintain the minimum described ratio of $0.06 \times 10^{-3}$ Zn/Ca. The first is to ensure from the outset that the amounts of dissolved zinc are as high as possible so that, as the operating life of the device progresses, said amounts are always above the described threshold. The second is to clean the surface of the zinc anode to recover its initial performance.

GB2531635 aims to increase the amounts of zinc to be dissolved in the water and the proportionality thereof to the flow rate thanks to the insertion of an electrical circuit that modifies the current intensity in the galvanic cell in connection with a flow meter and an electronic controller. The main drawbacks of this proposal are a high final cost of the device and its complexity.

Therefore, the main problem of the technique of water treatment based on the dissolution of zinc by devices that work electrolytically is the decrease in the concentration they contribute over time and that has a negative impact:

1) In the result to be obtained when the waters exceed a certain level of calcium content. Above 80 mg/l of calcium it can be said that there is not enough zinc to exceed the ratio $0.06 \times 10^{-3}$ Zn/Ca.
2) The absence of results passed a certain operational lifetime since the mineral deposits that are created on the anode surface progressively decrease the release of zinc ions.

The moment a new unit is able to increase the initial zinc contents, not only will the results be better, but also the operating life will be longer. At the moment of absence of results due to lack of zinc ions, you can simply clean the device for an hour with a weak acid easy to manipulate such as vinegar.

In order to overcome the limitations reported in the prior art in terms of solutions for the treatment of scales, a new device is proposed for this purpose.

DESCRIPTION OF THE INVENTION

The present invention describes a water treatment device for preventing scaling in water pipelines of the residential sector, which includes from the piping themselves to the appliances, especially those that heat the water. The present invention may be used in other sectors where it proves useful.

As previously mentioned, the provided low concentration of zinc is the main problem of current devices. According to the present invention, zinc values above the ratio $0.06 \times 10^{-3}$ Zn/Ca are obtained for the different reference average flow rates. The present invention is preferably configured for an average reference flow rate between 5-15 liters/minute, although it could be extended to other higher flow rates. The range of average reference flow rates 5-15 liters/minute, corresponds to the consumption of water in a residential home, where there are elements ranging from 12 liters/minute of the tap of a shower to 2 liters/minute of a sink, although any home can contain several elements such as those described operating simultaneously. In this sense, a housing with a single bathroom has an average reference flow rate of 5 liters/minute, while, in a housing with two or three bathrooms, the average reference flow rate is 10 liters/minute and finally in a housing with between four and eight bathrooms, said average reference flow rate can be estimated at 15 liters/minute.

Therefore, the present invention is directed to the treatment of different average consumption flow rates in homes of different sizes due to the scalability capacity thereof, whereby the above types of housing are covered with the adjustment of the surface of the galvanic cell employed.

Due to the deposits of minerals appearing on the anode surface progressively by the passage of water, the present invention may require the removal of said deposits by means of an acidic agent of easy use such as, for example, vinegar.

Additionally, for those cases where the flow rate of the water is more or less fixed, a zinc concentration proposal may be made for said flow rate.

Taking these factors into account, the device has an anti-scaling medium configured to prevent the formation of lime scales in the water pipeline, in the form of a galvanic cell, by comprising at least one cathode element and an anode sacrificial element. The device has a main body that surrounds the anti-scaling medium and is adaptable to a water pipeline, having a water flow inlet and an outlet that connect the device in the installation.

The most favorable alloy for achieving a higher concentration of zinc dissolved in water and passing through a galvanic cell is one whose zinc values are between 89.5 and 99.5% and aluminum are between 0.5 and 10%. Additionally, these alloys may contain less than 0.5% of the remaining alloys. These additional alloys include copper and magnesium as well as other unavoidable alloys present below 0.1%.

The cathode element, as an alternative to copper, can be made of other materials, such as brass. While it is true that the electrical intensity recorded in the cell between the anode and the cathode has small differences in favor of copper versus brass, in terms of the concentrations of zinc recorded between one and another cathode, it is where it is appreciated how copper is the preferred embodiment for the cathode element.

In a preferred embodiment, the anode sacrificial element of the device is a zinc alloy designated Zamak-3. Zamak-3 is a Zn-based alloy containing 3.5-4.3% aluminum, and to a lesser extent copper (less than 0.25%) or magnesium (0.02-0.05%). It barely contains other alloys (iron, lead, cadmium, tin), which are also present below 0.1%. This alloy is usually used in injection workshops to be able to mold any pieces. The low aluminum content of the alloy is of special relevance when complying with drinking water legislation, where a limit value of aluminum content is established in the environment of $200 \times 10^{-3}$ mg/l. Therefore, the use of said alloy in the anode sacrificial element leads to better results compared to other previously known solutions, whereby a relevant improvement in the treatment of water pipelines is achieved.

Likewise, the spacing of the anode and cathode elements of the device according to the present invention is as small as possible. A smaller spacing between the cathode and the anode generates a greater release of zinc ions. Additionally, one way to optimize a certain arrangement of an anode sacrificial element is to place a cathode element on both sides so as to extract the maximum from its surface. However, as a whole, the spacing between the cathode and anode element must be consistent with the water flow, that is, the closer the cathode and anode elements are, the greater pressure loss is created inside the device and that loss must not exceed that admissible by the installation.

Since mineral deposits will inevitably appear over the lifetime of the device and the zinc-based anode is consumed by its incorporation into the water, although the copper cathode remains unchanged, it is necessary to make an electrical connection of the galvanic cell that ensures the union between the elements. This is achieved thanks to screws and/or support elements made of stainless steel.

On the other hand, an increase in surface area in the anode sacrificial element, leaving the cathode element fixed, generates the same increase in electrical intensity as if we do the same operation inversely. If the two surfaces of the cathode and anode element are increased at the same time, the intensity increases in the same proportion. Thus, the present invention presents a parity configuration, without the need to establish a fixed relationship of surfaces between the cathode and anode element, although, if one surface is larger than another, a higher intensity is recorded with respect to the lower parity.

With regard to manufacturing, it is aimed to a solution that allows scalability. Once a model of a galvanic cell is available for a reference flow rate, the following embodiments of the invention comprise the addition of at least one other pair, with the only limit of the pressure losses that are created in the flow of the water.

Two basic configurations are proposed:
1) One where the surfaces of the anode and cathode elements are arranged perpendicular to the passage of water.
2) Another one where the surfaces of the anode and cathode elements are arranged parallel to the direction of the water.

In both configurations, anode and cathode elements are provided, which generate a sufficient contact to provide the water with the amount of zinc sufficient to prevent the formation of lime scales in the plumbing installation object of protection.

In the figures, the following elements are shown:
1. Device
2. Inlet of main body
3. Outlet of main body
4. Main body
5. Anti-scaling medium
6. Anode sacrificial element
7. Cathode Element
8. Support medium
9. Crosshead
10. Screw
11. Pipeline Throughout the description and claims the word "comprises" and its variants are not intended to exclude other technical features, components or steps. Furthermore, the word "comprises" includes the case "consists of". For those skilled in the art, other objects, advantages and features of the invention will become apparent in part from the description and in part from the practice of the invention. The following examples and drawings are provided by way of illustration and are not intended to be limiting of the present invention. In addition, the present invention covers all possible combinations of particular and preferred embodiments set forth herein.

DETAILED DESCRIPTION OF THE INVENTION

Figure 1:
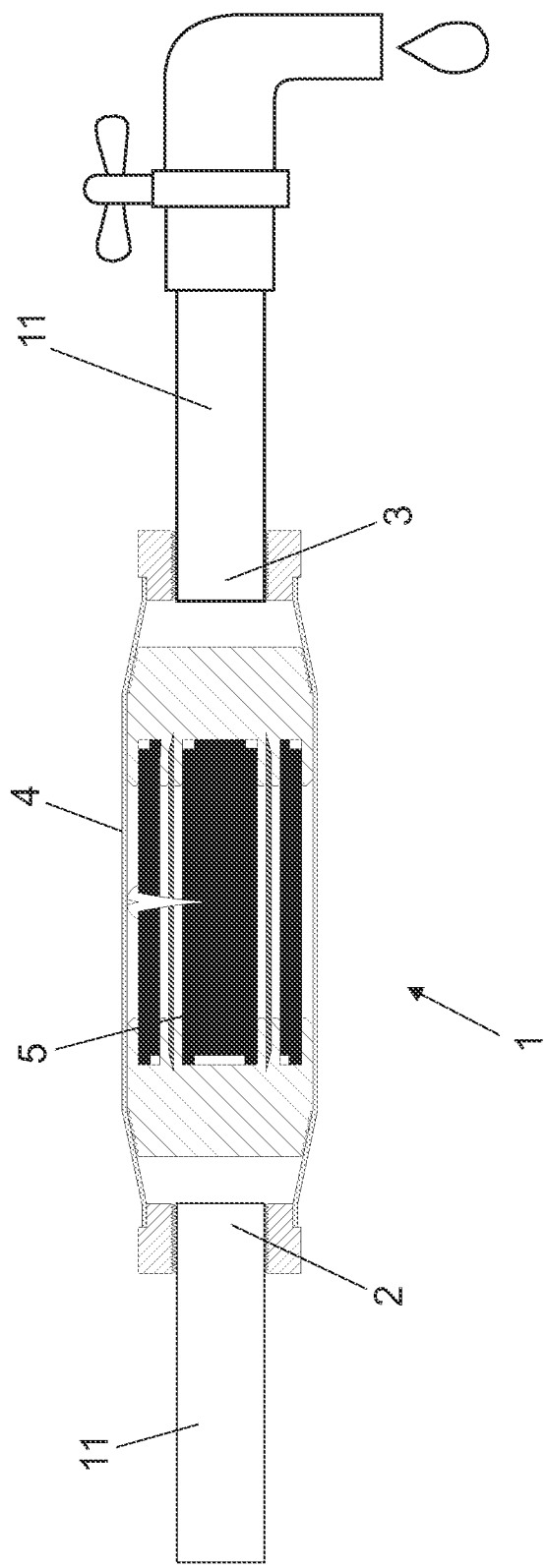
FIG. 1 schematically shows the arrangement of a device object of the invention interposed in a water pipeline.

FIG. 1 schematically shows the arrangement of a device (1) object of the invention interposed in a water pipeline (11). To this end, the device (1) comprises a main body (4), with an inlet (2) and an outlet (3), adaptable to a water pipeline (11).

Specifically, in this FIG. 1 there is shown a device (1) with an anti-scaling medium (5) comprising a galvanic cell, with at least one cathode element (7) and an anode sacrificial element (6). Said anti-scaling medium (5) requires the presence of a support medium (8) for its fixing to the main body (4).

As mentioned above, those configurations can be distinguished where the anode and cathode elements are arranged perpendicular or parallel to the direction of water flow.

Figure 2:
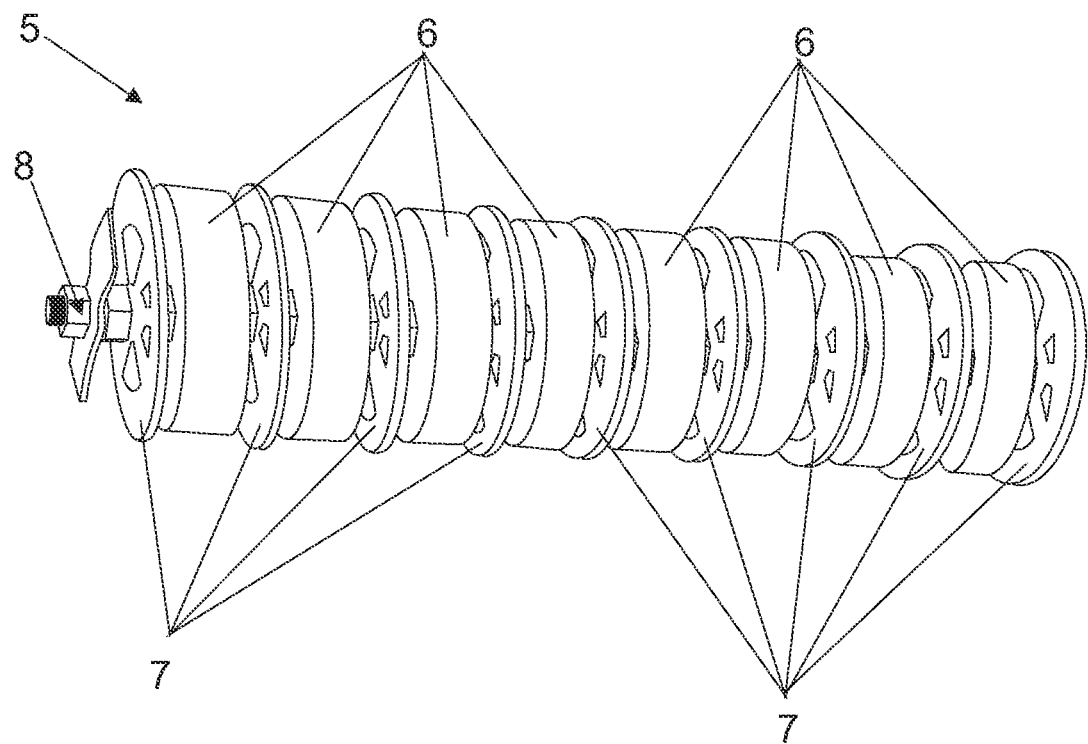
FIG. 2 shows an embodiment of an anti-scaling medium, comprising a galvanic cell, wherein the anode sacrificial element and the cathode element of the anti-scaling medium are a set of anode-cathode discs.

FIG. 2 shows an embodiment of an anti-scaling medium (5), wherein the anode sacrificial element (6) and the cathode element (7) of the anti-scaling medium (5) are a set of anode-cathode discs.

As seen in this embodiment, each disc of the anode (6) and cathode (7) elements is arranged perpendicular to the flow of the water pipeline (11). Thus, taking as main body (4) of the device (1) a circular copper pipe, said configuration has a support medium (8), in the form of a shaft, preferably composed of a threaded rod of stainless steel, where a cathode and anode disc are alternately placed so that in any case each face of the anode element faces another of the cathode element.

Thus, the spacing between each cathode element (7) and anode sacrificial element (6) can be achieved both with washers and with stainless steel screws.

The size of the opening of the water passage holes in both the anode sacrificial element (6) and the cathode element (7) is consistent with the inlet diameter of the water. The water goes from the central zone, where the axis of the support medium (8) is located, to the inner contour of the main body (4). This is achieved with at least one perforation in the central part of the anode sacrificial element (6) and a decrease in the diameter of the cathode element (7); or, in other embodiments, with openings in the outer part of the anode sacrificial element (6) and in the interior of the cathode element (7).

Obviously, the number of discs depends on the final content of zinc to be obtained.

The main disadvantage of this configuration is the high loss of load that occurs in the water flow, not permissible in the frame of a housing. Although this configuration is not recommended for solutions in homes, where the loss of load is very high, it can be used in another pipeline where this loss of load can be assumed by the installation.

For an embodiment where the anode (6) and cathode elements are five 8 mm thick zinc-based anode rings and six 1 mm thick cathode discs, with a water passage window in each disc, for a diameter of 15 mm piping and a water inlet in the device with an equally diameter of 15 mm (which can be easily found in a dwelling with a single bathroom), 4 mm apart from each other and inserted in a main body, constituted by a 40 mm inner diameter copper tube, pressure losses have been found for water speeds of 2 m/s (flow rate of 21.2 liters/minute) of 0.2 bar but at speeds of 3.5 m/s (flow rate of 37.11 liters/minute) can reach 1.3 bar.

Therefore, the acceptance of this configuration goes through the acceptance of a large pressure loss above a certain flow rate limit.

A preferred embodiment of the device (1) is achieved with an arrangement of the anti-scaling medium (5), where the main surfaces of the anode and cathode elements are parallel to the water flow.

Figure 3:
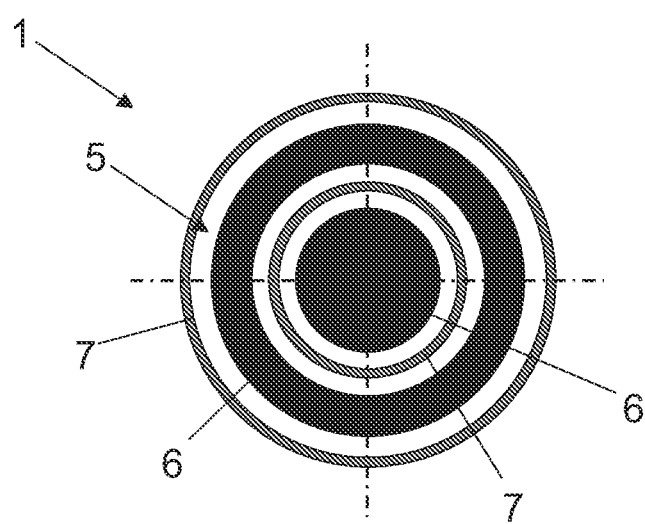
FIG. 3 shows a section of an embodiment of a device object of the invention with an anti-scaling medium where the anode sacrificial element and the cathode element of the anti-scaling medium are concentric tubes.
Figure 4:
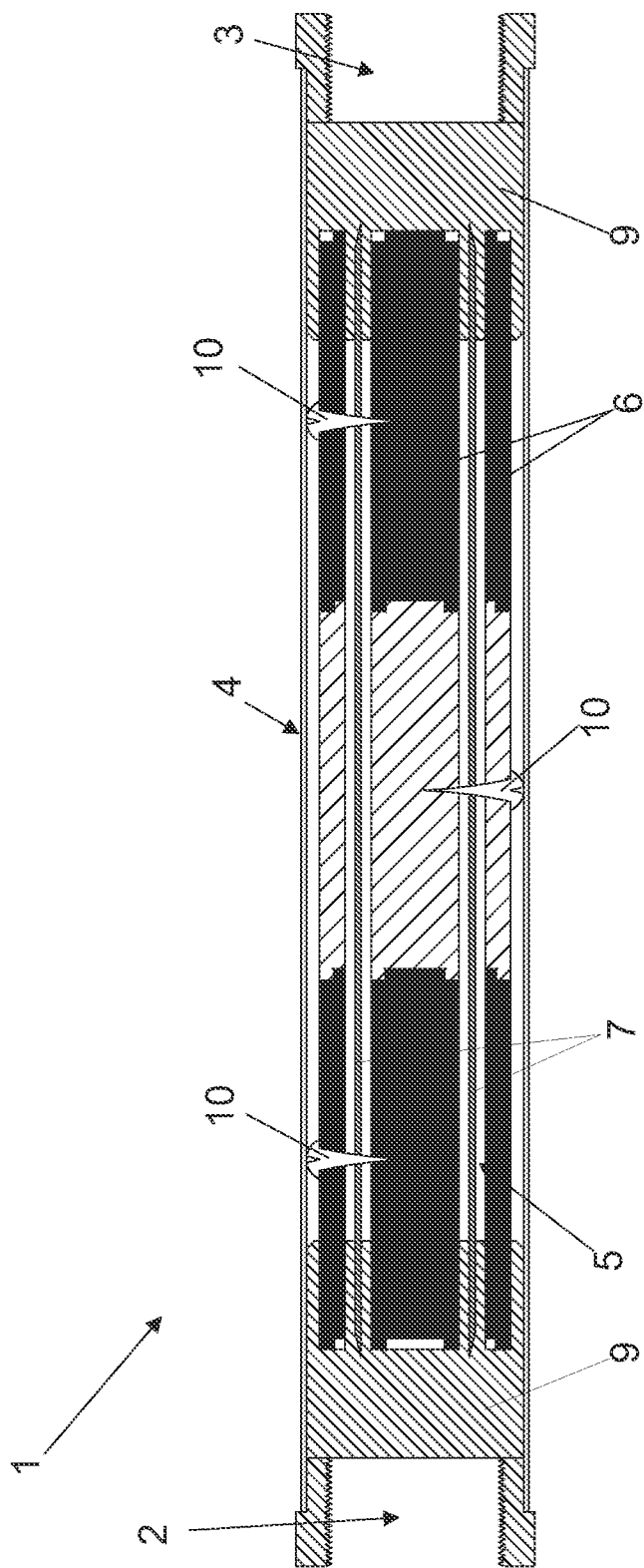
FIG. 4 shows a section of the profile of an embodiment of a device with an anti-scaling medium, where the anode sacrificial element and the cathode element of the anti-scaling medium are concentric tubes.

FIG. 3 and FIG. 4 show an embodiment of a device (1) object of the invention with an anti-scaling medium (5), comprising a galvanic cell, where both the anode elements (6) and the cathode elements (7) are concentric tubes.

First, in FIG. 3 the section of said device (1) is shown, showing each of the tubes used, as well as the water passage windows.

The device (1) comprises a main body (4) with an inlet (2) and an outlet (3) of the water flow, with an anti-scaling medium (5), located between the inlet (2) and the outlet (3).

Specifically, in FIG. 3, an embodiment is shown with two anode elements, a first cylinder, preferably solid, in the center of the anti-scaling medium (5) of the device and a second hollow cylinder located between two cathode tubes. In this way, a configuration of the anti-scaling medium (5) is generated that alternates anode and cathode tubes, leaving between them a water passage window, so that the water flow flowing through said windows is in contact with both the cathode and the anode of the galvanic cell.

Therefore, said preferred embodiment of the anti-scaling medium (5) comprises a double sacrificial anode (6) and double cathode (7) contained in a copper tube of diameter of 42 mm for nominal device inlet diameters of 16 mm, 20 mm and 27 mm. The arrangement of the elements is as follows:

First anode in the form of a solid cylinder with a diameter of 16 mm,
First 2 mm water passage window,
First cathode: hollow cylinder with a diameter of 22 mm and a thickness of 1 mm,
Second 2 mm water passage window,
Second anode: hollow cylinder with a diameter of 35 mm and a thickness of 4.5 mm,
Third 2.5 mm water passage window, and
Second cathode: hollow cylinder with a diameter of 42 mm and a thickness of 1 mm FIG. 4 shows a section of the profile of an embodiment of a device (1) with an anti-scaling medium (5) where the anode element (6) and the cathode element (7) are concentric tubes. Said section corresponds to the embodiment of the device (1) shown in FIG. 3.

As can be seen in FIG. 4, the device (1) has a main body (4) of tubular shape, where the water flows inside. In an alternative embodiment of the device (1), the inlet (2) and outlet of the (3) main body (4) has a thread, configured to facilitate the connection to the water pipeline to be treated.

The anti-scaling medium (5) configured to prevent the formation of lime scales is made up of units, which can be linked, giving rise to devices with greater dimensions. In FIG. 4, unlike the embodiment shown in FIG. 1, an anti-scaling medium (5) is specifically shown with three units linked by a tongue-and-groove joint.

To facilitate both the passage of water through the device (1) and the fixing of the galvanic cell constituting the anti-scaling medium (5) therein, it is necessary to use a support medium (8) in the case where the galvanic cell has a cylindrical shape in turn within a copper duct. To guarantee the electrical connection in the short and long term, while the deposits of minerals in the anode sacrificial element (6) can prevent it, a crosshead (9), preferably of stainless steel, is used in each use of the ends of the anti-scaling medium (5).

The electrical connection in the galvanic cell is further ensured thanks to at least one screw (10), preferably of stainless steel, which fixes the three inner elements and will maintain the electrical contact with the tube by simple pressing of the head of the screw (10) with the inner surface of the tube. As is known, stainless steel is stable in contact with drinking water and does not contribute any contamination to the environment.

Figure 5:
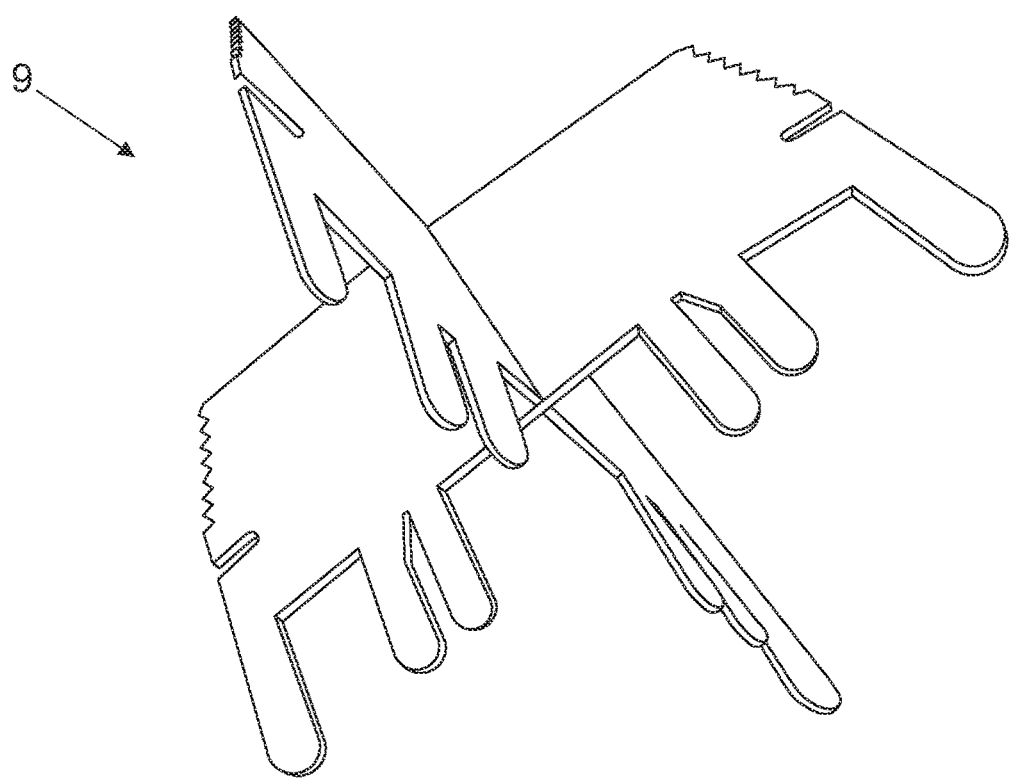
FIG. 5 shows an embodiment of a crosshead of the support medium.

FIG. 5 shows an embodiment of a crosshead of the support medium. These crosspieces (9) not only ensure the parallelism and spacing of all these elements of the anti-scaling medium (5) that comprise the galvanic cell, but thanks to a mordant element to the set of inner tubes and a sufficient pressure to the outer tube by a toothed joint, guarantees said contacts between the elements of the galvanic cell.

For assemblies such as those described 7 cm in length and an inlet of 15 mm in diameter, zinc concentrations above the ratio $0.06 \times 10^{-3}$ Zn/Ca have been recorded in very hard waters at flow rates of 5 liters/min at the beginning of their start-up with pressure losses of 0.04 bar for water speeds of 3.5 m/s.

Therefore, the devices whose inlet diameter is 20 mm and 27 mm and which respond to type dwellings whose reference flow rate is 10 liters/minute and 15 liters/minute are solved by the simple addition of a second and a third body as described to make galvanic cells of approximately 14 and 21 cm in length. The pressure losses recorded can be assumed within the framework of the residential sector.

Figure 6:
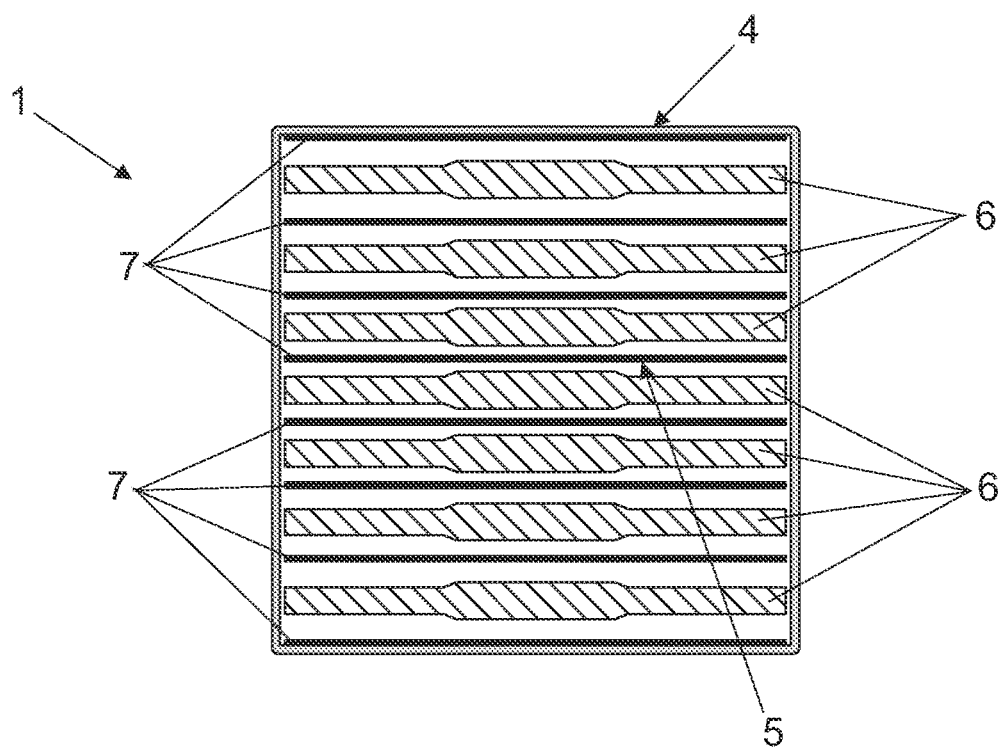
FIG. 6 shows an embodiment of a device object of the invention with square section with an anti-scaling medium, where the anode sacrificial element and the cathode element of the anti-scaling medium, comprising a galvanic cell, are anode and cathode sheets.
Figure 7:
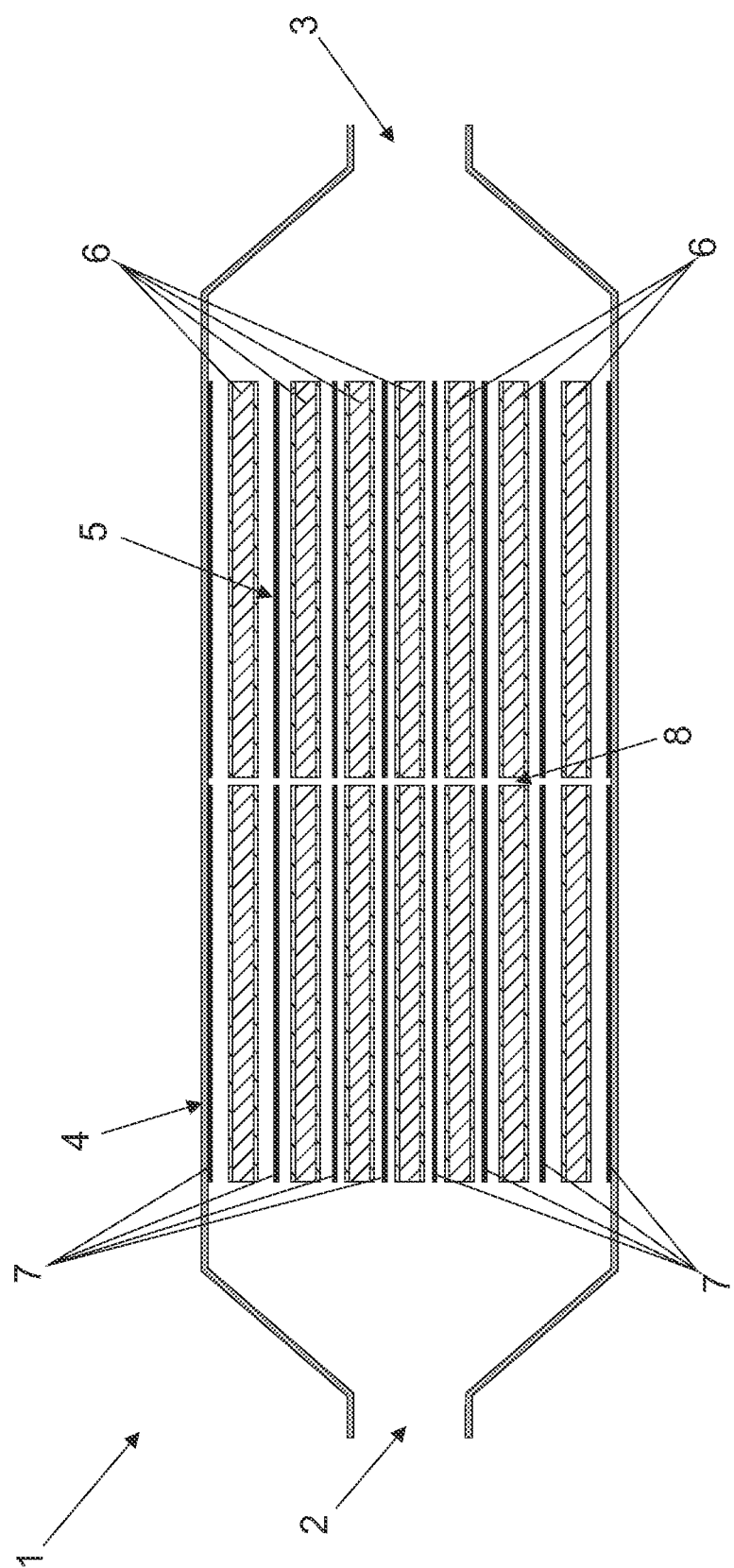
FIG. 7 shows a section of the profile of an embodiment of a device with square section with an anti-scaling medium, where the anode sacrificial element and the cathode element of the anti-scaling medium are anode and cathode sheets.

Finally, FIG. 6 and FIG. 7 show an embodiment of a device (1) object of the invention with square section with an anti-scaling medium (5) where the anode element (6) and the cathode element (7) of the anti-scaling medium (5) are alternating anode and cathode sheets, preferably made of a zinc and copper alloy, respectively.

In this configuration, the device (1) has a main body (4) in the form of a square tube, preferably made of stainless steel, used as a container for galvanic cells. Its availability in the market is relatively simple for many measures and there is no problem in its contact with drinking water.

In a specific embodiment, the main body (4) of square section has outer dimensions 100 mm×100 mm for inlets in the device of diameters 35 mm, 42 mm and 54 mm.

Because the movement of the water inside a pipeline (11) of greater dimensions than another that precedes it, tends to go through the center thereof, the shape and arrangement of the sheets of the anode element (6) have to displace the set of the water that is received uniformly to all the windows of passage of the water.

Thus, in a preferred embodiment, the anode element (6) of the anti-scaling medium (5) has a laminated design, where the anode sheets have a greater thickness in their central third and whose separations from the cathode element increase as we move away from the center of the section of the main body (4). Thus, the spacing between the anode sheet and the cathode sheet is larger in the peripheral region of the sheets of the anti-scaling medium than in the center.

The securing of the electrical contact in the cell will be achieved again by means of a support medium (8):

First of all, the support medium (8) consists of a screw (10), preferably of stainless steel, which crosses the center of each sheet of the anode (6) and cathode (7) elements and which, preferably by screwing on them, maintains the electrical contact of all of them.

Secondly, the support medium (8) has a fixing of the set of sheets, for example, by means of at least one rod, preferably of stainless steel, threaded that fixes a suitable spacing for the passage of water between the sheets of the anode (6) and cathode element (7). Similar to previous cases, the spacing of the sheets may be achieved, for example, through stainless steel washers and/or nuts.

Therefore, the use of any of the embodiments described in the present invention manages to prevent the formation of lime scales in a water pipeline, increasing the durability of these pipelines.

The invention claimed is:

1. A device for preventing the formation of lime scales in a water pipeline comprising a main body with an inlet and an outlet, and an anti-scaling medium configured to prevent the formation of lime scales, located within the main body, between the inlet and the outlet, wherein the anti-scaling medium comprises a galvanic cell, with at least one cathode element and an anode sacrificial element, and a support medium of the galvanic cell configured to be fixed to the main body;

wherein the anode sacrificial element is made of a zinc-based alloy containing 3.5-4.3% aluminum, less than 0.25% copper, 0.02-0.05% magnesium and a total of less than 0.1% metals of iron, lead, cadmium, and/or tine and the balance zinc.

2. The device according to claim 1, wherein the anode sacrificial element and the at least one cathode element of the anti-scaling medium comprise a set of anode discs and cathode discs, and the support medium is a shaft on which the discs are arranged, wherein the set of discs alternates an anode disc with a cathode disc, wherein each disc comprises at least one perforation configured for the passage of water.

3. The device according to claim 1, wherein the anode sacrificial element and the at least one cathode element of the anti-scaling medium together are a set of concentric tubes, wherein said set of concentric tubes alternates a cathode tube and an anode tube separated by a water passage window.

4. The device according to claim 3, wherein the anti-scaling medium comprises a solid cylinder concentric with the cathode tube and the anode tube.

5. The device according to claim 3, wherein the support medium comprises a crosshead located at opposite ends of the anti-scaling medium and at least one screw in electrical contact with each one of the concentric tubes.

6. The device according to claim 1, wherein the anode sacrificial element and the at least one cathode element of the anti-scaling medium together are a set of sheets formed by an anode sheet and at least one cathode sheet, wherein said sheets are separated by a water passage window.

7. The device according to claim 6, wherein the set of sheets of the anti-scaling medium alternates the anode sheet and the at least one cathode sheet.

8. The device according to claim 6, wherein the anode sheet of the anti-scaling medium has a relatively greater thickness in a central third of the at least one anode sheet.

9. The device according to claim 8, wherein a spacing between the anode sheet and the at least one cathode sheet is greater in a peripheral region of the anti-scaling medium than in the central third of the at least one anode sheet.

10. The device according to claim 1, wherein the at least one cathode element is copper.

\* \* \* \* \*